Patented July 10, 1951

2,560,502

UNITED STATES PATENT OFFICE 2,560,502

METALLIFEROUS MONOAZO DYESTUFFS

Heinrich H. Bestehorn, Glen Rock, and Wilhelm Schmidt-Nickels, Little York, N. J., assignors to General Aniline & Film Corporation, New York, N. Y., a corporation of Delaware No Drawing. Application October 22, 1948, Serial No. 56,048

4 Claims. (Cl. 260—146)

This invention relates to novel water-soluble metalliferous azo dyestuffs yielding dark shades on wool and similar animal fibers of outstanding fastness to light, washing and fulling and having excellent resistance to crocking.

The dyestuffs of this invention are obtained by coupling a diazotized mononuclear ortho-aminophenol sulfonic acid or sulfonamide with a naphthioindoxyl (i. e., a benzo-3-oxythionaphthene) and reacting the resulting azo dye, either before, during or after dyeing, with a metal complex-forming compound of a metal having an atomic weight from 52 to 64.

The thiophene nucleus of the naphthioindoxyl can be condensed with the naphthalene nucleus thereof in 1-2, 2-1 or 2-3 position, and the naphthalene nucleus can be further substituted, e. g., by halogen such as chlorine or bromine, lower alkyl groups or lower alkoxy groups. The benzene ring of the diazo component can also be further substituted, e. g., by nitro, halogen, carboxy, lower alkyl or lower alkoxy groups.

The unmetallized intermediate azo compounds employed in accordance with this invention yield brownish or reddish shades on wool which are quite sensitive to alkaline or acid treatment and to oxidation, so that the resulting dyeings as such are of no practical value. However, when the azo compounds are metallized by reaction with a metal complex-forming compound of a metal having an atomic weight from 52 to 64, e. g., chromium, copper, nickel and cobalt, and preferably chromium, either before, during or after application of the azo compounds to the animal fibers to be dyed, much deeper shades are obtained, particularly dark blue to black, which are no longer sensitive to oxidation, alkaline or acid treatment and which possess the outstanding fastness properties indicated above.

It was known heretofore, as disclosed in U. S. Patent 1,233,433 and German Patent 193,724, to prepare metallized monazo dyestuffs from the product obtained by coupling a diazotized aminophenol sulfonic acid with thioindoxyls. While the resulting dyestuffs and colorations produced therewith have moderate fastness properties, according to present standards they are deficient for many purposes, particularly in fastness to washing and to light. Thus, the fastness to washing of a number of chromed monazo dyestuffs obtained from a diazotized ortho-aminophenol sulfonic acid and thioindoxyls was rated to be fair at best, while the light fastness measured in a fadeometer was between 35 and 65 hours. On the other hand, similarly chromed azo dyestuffs of the present invention obtained from diazotized aminophenol sulfonic acid and naphthioindoxyls exhibited excellent fastness to washing, and had a light fastness, similarly measured, of 100 to 200 hours.

The dyestuffs in accordance with the present invention are illustrated by the following examples, wherein parts are by weight.

Example 1

18.9 parts of 2-aminophenol-4-sulfonic acid were diazotized by reaction at 0° C. with 32.8 parts of 21° Bé. hydrochloric acid and 6.9 parts of sodium nitrite in 30% aqueous solution. The resulting solution of the diazo compound was added to a mixture of 20.0 parts of 2,1-naphthioindoxyl with 200 parts of 40% aqueous sodium hydroxide solution. When coupling was completed, the azo compound which was formed was precipitated by salting out and recovered by filtration. The resulting water-soluble monazo compound in the form of its free acid had the following formula:

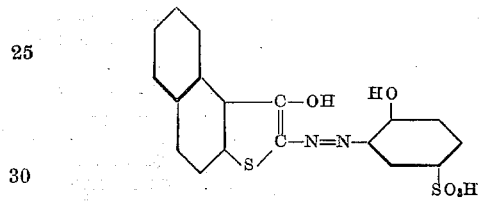

A quantity of wool was dyed by a top chrome procedure, involving treatment in a hot bath containing the aforesaid azo compound, with Glauber salt and dilute sulfuric acid, whereby a brownish red shade was produced. After the dyestuff was exhausted, 1 to 3% of bichromate was added and the bath heated to boiling for ½ to 1 hour. The dyed material was then rinsed and dried. A deep blue-black shade was obtained, having excellent fastness to washing, and a light fastness of from 100 to 200 hours as measured in a fadeometer.

Similar shades are produced in a monochrome process, wherein for example, sodium and ammonium bichromate are added to a bath at about 40° C. containing 10% Glauber salt together with the above azo compound. Wool is introduced into the bath, which is heated to boiling for 2 hours. A deep blue-black shade is likewise obtained having the same fastness properties produced in the top chrome process.

The azo compound of this example can be converted to its chromium complex by boiling an aqueous solution of the azo compound with at least an equimolecular amount of a chromium salt such as chromium fluoride. The resulting chromium complex of the azo compound is salted out and recovered by filtration. It constitutes a dark powder, soluble in water, yielding blue-black shades on wool from an acid bath, similar in properties to those produced by the top chrome and monochrome treatments just described.

*Example 2*

18.9 parts of 2-aminophenol-4-sulfonic acid are diazotized as described in Example 1, and the resulting solution is added to a mixture of 23.5 parts of 8-chloro-1,2-naphthioindoxyl with 200 parts of 40% aqueous sodium hydroxide solution. The resulting azo compound which is separated from the solution by salting out and filtering has the following formula:

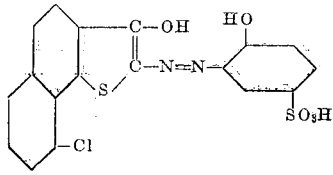

This compound can be converted into its chromium complex in substance or on the fiber as described in Example 1. Wool is dyed by application of the chromium complex of the azo compound, or by the monochrome or top chrome procedure of the preceding example in deep blue-black shades having fastness properties similar to those indicated for the dyestuff of Example 1.

Dyestuffs having similar fastness properties are obtained from the corresponding 1,2- and 2,3-naphthioindoxyls, when coupled with diazotized 2-aminophenol-4-sulfonic acid and chromed by the procedure of the foregoing examples. Instead of 2-aminophenol-4-sulfonic acid, the corresponding sulfonamide can be employed in the examples with similar results.

Other ortho-aminophenol sulfonic acids which can be employed in producing the metalliferous azo dyestuffs of this invention can be further substituted in the benzene nucleus by such groups as nitro, halogen (chlorine or bromine), carboxyl, lower alkyl such as methyl or ethyl groups, or lower alkoxy groups such as methoxy or ethoxy groups, or by more than one of these substituents. Thus, suitable ortho-aminophenol sulfonic acids include the following:

5-methyl-2-aminophenol-4-sulfonic acid
6-methyl-2-aminophenol-4-sulfonic acid
5-methoxy-2-aminophenol-4-sulfonic acid
6-chloro-2-aminophenol-4-sulfonic acid
6-carboxy-2-aminophenol-4-sulfonic acid
5-nitro-2-aminophenol-4-sulfonic acid
6-nitro-2-aminophenol-4-sulfonic acid
5-nitro-6-methyl-2-aminophenol-4-sulfonic acid
5-nitro-6-chloro-2-aminophenol-4-sulfonic acid
2-aminophenol-5-sulfonic acid
4-methyl-2-aminophenol-5-sulfonic acid
4-chloro-2-aminophenol-5-sulfonic acid
4-chloro-2-aminophenol-6-sulfonic acid
4-nitro-2-aminophenol-6-sulfonic acid
4-methyl-2-aminophenol-6-sulfonic acid
4-chloro-5-nitro-2-aminophenol-6-sulfonic acid
4-methyl-5-nitro-2-aminophenol-6-sulfonic acid
4-chloro-2-aminophenol-3-sulfonic acid
6-methoxy-2-aminophenol-3-sulfonic acid The corresponding sulfonamides can be employed in place of the sulfonic acids listed above.

The naphthioindoxyls constituting the coupling component in preparing the azo compounds of this invention can also be substituted in the free positions of the naphthalene nucleus, for example, by chlorine, bromine, methyl, ethyl, methoxy and ethoxy groups, or by more than one of these groups. Thus, dyestuffs having similar properties to those obtained in the examples can be prepared by using 8-chloro- or 8-bromo-1,2-naphthioindoxyl, 5-chloro-6-methoxy-2,1-naphthioindoxyl, 5-bromo-6-methoxy-2,1-naphthioindoxyl, 5-chloro-6-ethoxy-2,1-naphthioindoxyl and 5-bromo-6-ethoxy-2,1-naphthioindoxyl. The 1,2- and 2,1-naphthioindoxyl can be prepared from the corresponding naphthalene 1- or 2-sulfo acids respectively, containing, for example, halogen, alkyl or alkoxy groups in positions other than the ortho position to the sulfonic acid radical, by conversion to the corresponding sulfonyl chloride, reduction thereof to the corresponding mercaptan, conversion of the latter to a thioglycollic acid radical by condensation with chloroacetic acid, transformation of this radical to the corresponding acid chloride by reaction with phosphorus trichloride and effecting ring closure in the presence of aluminum chloride. The 2,3-naphthioindoxyls can be obtained from 2-amino-3-naphthoic acid and its alkyl, halogen and alkoxy substituted derivatives by conversion of the amino group to a mercaptan group by diazotization and reaction with a sulfide, transformation of the mercapto radical to a thioglycollic acid radical by reaction with chloroacetic acid, and ring closure with the elimination of carbon dioxide to form the desired product.

The chroming treatment of the foregoing examples can be applied to any of the dyestuffs prepared from the foregoing azo dye compounds, either in substance or by treatment during or after dyeing with the metallized compound. Suitable chroming agents include alkali metal chromates, and water-soluble chromium salts such as chromium fluoride. Instead of chromium compounds, other complex-forming compounds of metals having an atomic weight from 52 to 64 can be employed in the same manner to prepare the corresponding metallized azo compounds in substance or on the fiber. Such compounds include copper sulfate, cuprous chloride, copper nitrate, and the corresponding nickel or cobalt salts. These metals likewise yield dyestuffs and colorations of outstanding fastness properties having deep shades.

Since similar colorations are produced on wool and similar animal fibers when the azo compounds of this invention are metallized in substance, or on the fiber during or after dyeing, the same metalliferous dyestuffs are evidently produced in each case. Accordingly, the step of metallizing specified in the following claims includes metallization in substance as well as on the fiber, and the metallized dyestuffs include the dyestuffs formed by any of these methods.

Variations and modifications which will be obvious to those skilled in the art can be made in the compositions and processes of this invention without departing from the scope thereof.

We claim:

1. Water-soluble metallized monazo dyestuffs containing in complex combination a complex-forming metal having an atomic weight of from 52 to 64, corresponding to a monazo dyestuff having the formula:

A—N=N—B wherein A is the radical of a naphthioindoxyl attached to the azo group in the 2-position, and —N=N—B is the radical of a diazotized mononuclear ortho-aminophenol containing a nuclear substituent of the class consisting of a sulfonate and a sulfonamide group.

2. A water-soluble metallized monazo dyestuff containing chromium in complex combination and corresponding to a monazo dyestuff having the formula:

A—N=N—B wherein A is the radical of a naphthioindoxyl attached to the azo group in the 2-position, and —N=N—B is the radical of a diazotized mononuclear ortho-aminophenol sulfonic acid.

3. A chromed monazo dyestuff containing chromium in complex combination and corresponding to the azo dyestuff having the formula:

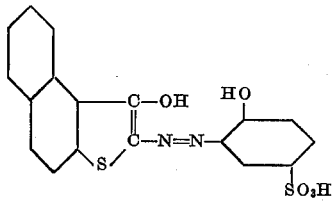

4. A chromed monazo dyestuff containing chromium in complex combination and corresponding to the azo dyestuff having the formula:

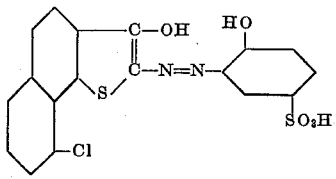

HEINRICH H. BESTEHORN.
WILHELM SCHMIDT-NICKELS.

REFERENCES CITED

The following references are of record in the file of this patent:

UNITED STATES PATENTS

| Number | Name | Date |
|---|---|---|
| 1,233,433 | Wuth et al. | July 17, 1917 |

OTHER REFERENCES

Friedlander et al., Ann. der Chemie, v. 388 (1912), pp. 10–11, 2 pages.